(12) United States Patent
Chen et al.

(10) Patent No.: US 7,668,266 B2
(45) Date of Patent: Feb. 23, 2010

(54) CREST FACTOR REDUCTION IN OFDM USING BLIND SELECTED PILOT TONE MODULATION

(75) Inventors: Ning Chen, Atlanta, GA (US); Guotong Zhou, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 595 days.

(21) Appl. No.: 11/374,704

(22) Filed: Mar. 14, 2006

(65) Prior Publication Data

US 2006/0274868 A1  Dec. 7, 2006

Related U.S. Application Data

(60) Provisional application No. 60/663,148, filed on Mar. 18, 2005.

(51) Int. Cl.
*H04L 1/02* (2006.01)
(52) U.S. Cl. .................. 375/347; 375/260; 375/340; 370/203; 370/208; 370/210; 370/335; 370/342; 370/480
(58) Field of Classification Search .................. None
See application file for complete search history.

(56) References Cited

U.S. PATENT DOCUMENTS

| | | | | |
|---|---|---|---|---|
| 6,130,918 A * | 10/2000 | Humphrey et al. | ........... | 375/295 |
| 6,178,158 B1 * | 1/2001 | Suzuki et al. | ............... | 370/203 |
| 6,473,467 B1 * | 10/2002 | Wallace et al. | .............. | 375/267 |
| 6,529,925 B1 * | 3/2003 | Schenk | ........................ | 708/300 |
| 6,983,026 B2 * | 1/2006 | Pinckley et al. | ............. | 375/296 |
| 7,028,246 B2 * | 4/2006 | Kim et al. | .................... | 714/784 |
| 7,376,074 B2 * | 5/2008 | Jung et al. | ................... | 370/208 |
| 2002/0031083 A1 * | 3/2002 | Jin | ............................. | 370/210 |
| 2004/0162097 A1 * | 8/2004 | Vijayan et al. | .............. | 455/522 |
| 2005/0141408 A1 * | 6/2005 | Anvari | ........................ | 370/206 |
| 2006/0141953 A1 * | 6/2006 | Willenegger | ................. | 455/102 |
| 2007/0047431 A1 * | 3/2007 | Nishio et al. | ................. | 370/203 |

\* cited by examiner

*Primary Examiner*—David C Payne
*Assistant Examiner*—Leon Flores
(74) *Attorney, Agent, or Firm*—Ryan A. Schneider; Troutman Sanders LLP

(57) ABSTRACT

Orthogonal frequency division multiplexing (OFDM) is a spectrally efficient multicarrier modulation technique for high speed data transmission over multipath fading channels, but has low power efficiency. OFDM signals have large crest factors, or peak-to-average power ratios (PARs) which lead to power inefficiency in the RF portion of the transmitter. Selected mapping can be used to reduce the PAR of an OFDM signal and is distortionless. A technique is disclosed that links the index of a phase rotation sequence used in selected mapping to the location of pilot tones that are used to estimate the channel. Each pilot tone location-phase sequence selection produces a different PAR value for the time-domain OFDM signal, and the signal with the lowest PAR value is transmitted. The technique is "blind" in that the optimum pilot tone location-phase sequence index is not transmitted as side information. A technique to blindly detect the optimum index at the receiver is also disclosed.

13 Claims, 5 Drawing Sheets

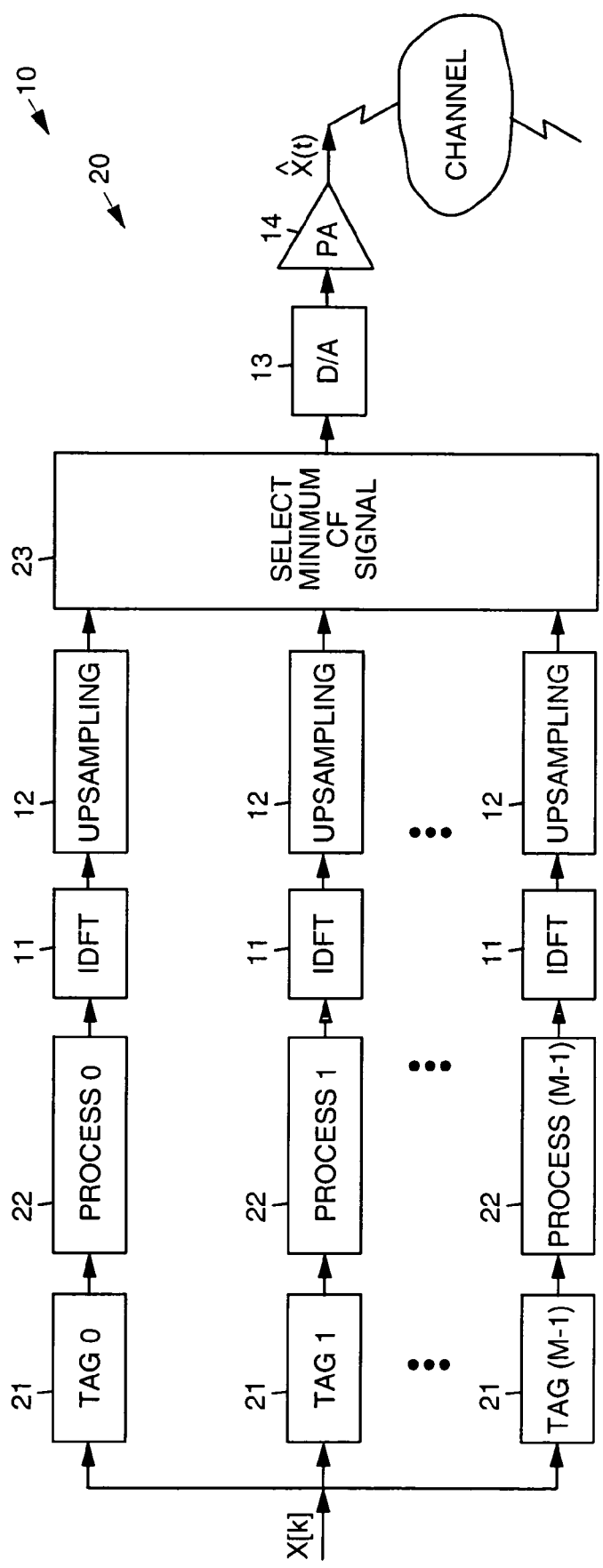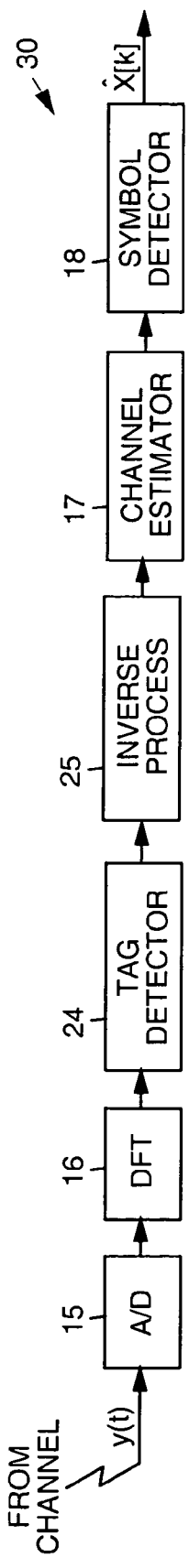
Fig. 1

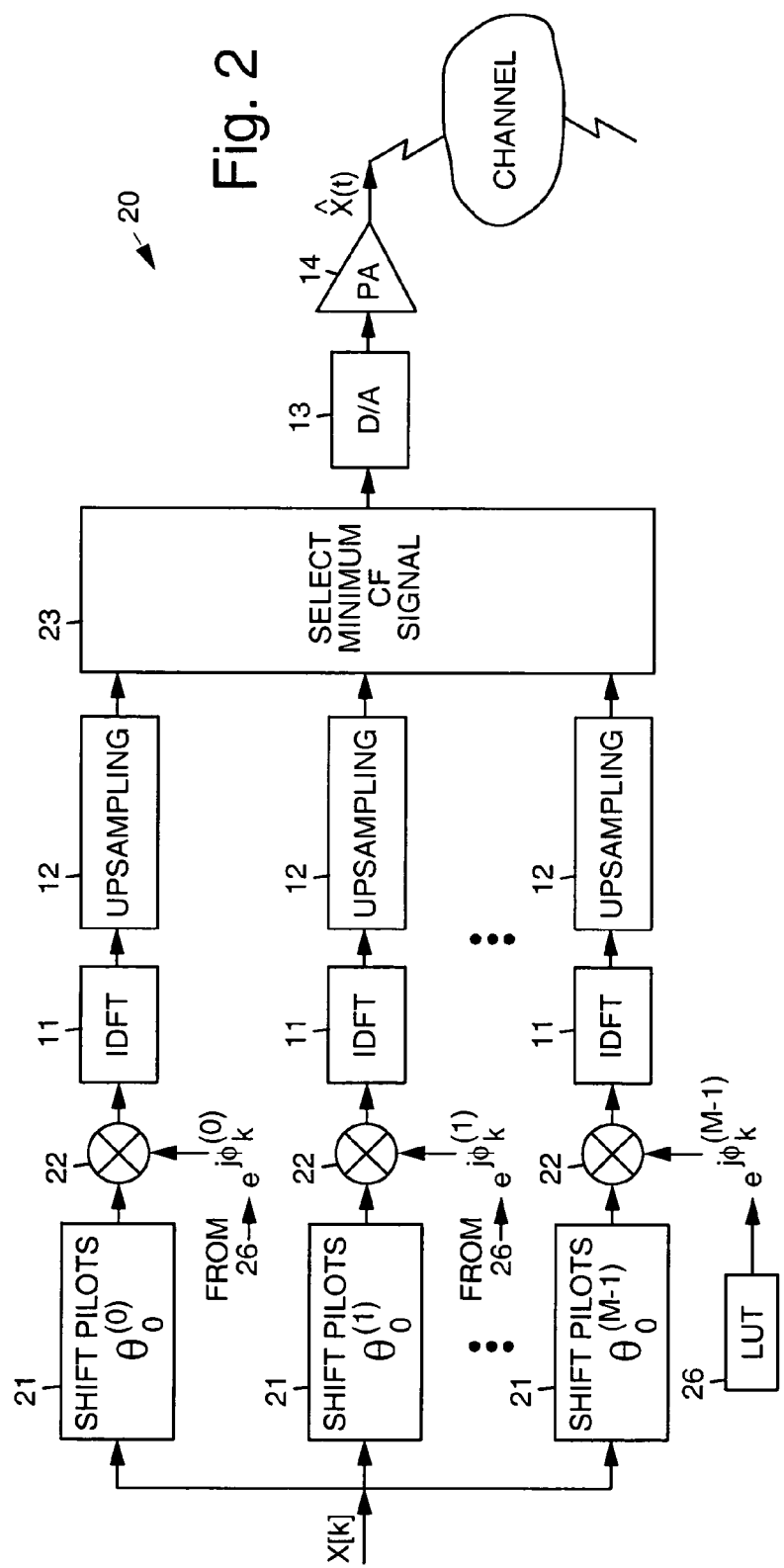
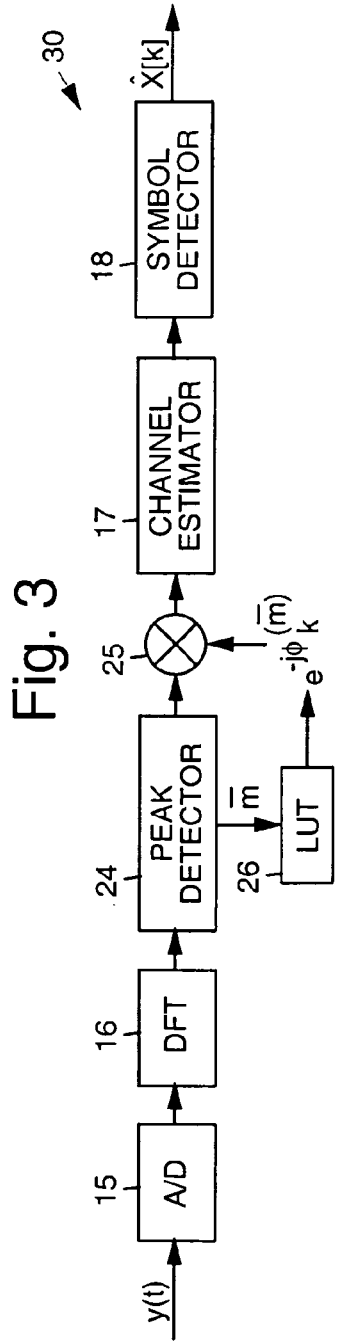

CREST FACTOR REDUCTION IN OFDM USING BLIND SELECTED PILOT TONE MODULATION

This application claims the benefit of U.S. Provisional Application No. 60/663,148, filed Mar. 18, 2005.

STATEMENT REGARDING FEDERALLY SPONSORED RESEARCH OR DEVELOPMENT

This invention was made with Government support under Agreement No. CCR-0218778 awarded by the National Science Foundation, and the U.S. Army under contract No. DAAD19-01-2-0011. The U.S. Government may have a paid-up license in this invention and the right in limited circumstances to require the patent owner to license to others on reasonable terms as provided for by the terms of the Agreement.

BACKGROUND

The present invention relates to RF transmission systems and methods, and more particularly, to peak-to-average power ratio (or crest factor) reduction in orthogonal frequency division multiplexing (OFDM) systems using blind selected pilot tone modulation.

OFDM is a spectrally efficient multicarrier modulation technique for high speed data transmission over multipath fading channels. However, OFDM signals suffer from significant amplitude fluctuations; i.e., they exhibit large peak-to-average power ratios (PARs). Crest factor is the square root of PAR so they have the same value in dB. These two terms are used interchangeably in the literature and herein. High PARs require significant backoff of the average operating power of a RF power amplifier if the signal is to be linearly amplified. Power inefficiency leads to low battery life for a mobile user and high operating cost for the base station. According to G. Rabjohn and J. Wight, in "Improving efficiency, output power with 802.11a out-phasing PAs," *CommsDesign.com* (*EE Times*), January 2004, the high power consumption and limited performance of traditional 802.11a OFDM systems had delayed the adoption of 802.11a and dual-band WLAN products.

Denote by $\{X_l[k]_{k=0}^{N-1}\}$ the lth block of the frequency domain OFDM signal drawn from a known constellation, where N is the number of sub-carriers. For the balance of this disclosure, the block index l will be dropped for notational simplicity, since OFDM can be free of inter-block interference with proper use of the cyclic prefix. The complex baseband OFDM signal can be written as $$x(t) = \frac{1}{\sqrt{N}} \sum_{k=0}^{N-1} X[k] e^{\frac{j2\pi kt}{T_s}}, \quad (1)$$

$$0 \le t \le T_s$$

where $T_s$ is the OFDM symbol period and $j=\sqrt{-1}$. The PAR of x(t) is defined by H. Ochiai, for example, in "Performance analysis of peak power and band-limited OFDM system with linear scaling," *IEEE Trans. Wireless Commun.*, vol. 2, no. 5, pp. 1055-1065, September 2003, as $$PAR(x(t)) = \frac{P_{max}}{P_{av}}, \quad (2)$$

where $P_{max}=\max_{0\le t\le T}|x(t)|^2$ is the peak power, $P_{av}=E|x(t)|^2$ is the average power of the OFDM symbol, and $E[.]$ denotes expectation, or time-averaged expectation if x(t) is nonstationary. Nyquist-rate sampled OFDM signal is given by $x[n]=x(t)|_{t=nT_s/N}$.

According to an Altera Corporation white paper entitled "Accelerating WiMAX system design with FPGAs,", October 2004, http://www.altera.com/literature/wp/wp_wimax-.pdf, crest factor reduction (CFR) is an essential function for OFDM based systems such as WiMAX (IEEE 802.16). The topic of CFR has attracted a lot of attention in the recent years. Proposed techniques include (i) distortionless CFR, such as coding discussed by A. E. Jones, T. A. Wilkinson, and S. K. Barton, in "Block coding scheme for reduction of peak to mean envelope power ratio of multicarrier transmission scheme," *Elec. Lett.*, vol. 30, no. 25, pp. 2098-2099, December 1994, tone reservation discussed by J. Tellado, in *Multicarrier Modulation with Low PAR—Applications to DSL and Wireless*, Kluwer Academic, 2000 and B. S. Krongold and D. L. Jones, in "An active-set approach for OFDM PAR reduction via tone reservation," *IEEE Trans. Signal Processing*, vol. 52, issue 2, pp 495-509, February 2004, tone injection discussed by J. Tellado, in *Multicarrier Modulation with Low PAR—Applications to DSL and Wireless*, Kluwer Academic, 2000, selected mapping discussed by R. W. Bäuml, R. F. H. Fischer and J. B. Huber, in "Reducing the peak-to-average power ratio of multicarrier modulation by selected mapping," *Elec. Lett.*, vol. 32, no. 22, pp. 2056-2057, October 1996, M. Breiling, S. H. Muller-Weinfurtner, and J. B. Huber, in "SLM peak-power reduction without explicit side information," *IEEE Commun. Lett.*, vol. 5, no. 6, pp. 239-241, June 2001, and A. D. S. Jayalath and C. Tellambura, in "A blind SLM receiver for PAR-reduced OFDM," in *Proc. IEEE Vehicular Technology Conference—Fall*, vol. 1, pp. 219-222, September 2002, and partial transmit sequence discussed by A. D. S. Jayalath and C. Tellambura, in "Adaptive PTS approach for reduction of peak-to-average power ratio of OFDM signal," *Elec. Lett.*, vol. 36, no. 14, pp 1226-1228, July 2000; (ii) CFR with distortion, such as deliberate clipping discussed by S. M. Ju and S. H. Leung, in "Clipping on COFDM with phase on demand," *IEEE Commun. Lett.*, vol. 7, no. 2, pp. 49-51, February 2003, transmit filtering discussed by S. B. Slimane, in "Peak-to-average power ratio reduction of OFDM signals using pulse shaping," in *Proc. IEEE GLOBECOM 2000*, vol. 3, pp. 1412-1416, November 2000, companding approaches discussed by T. Jiang and G. Zhu, in "Nonlinear companding transform for reducing peak-to-average power ratio of OFDM signals," *IEEE Trans. Broadcast.*, vol. 50, no. 3, pp. 342-346, September 2004; and (iii) various combinations of the above. These methods entail different tradeoffs involving CFR capability, complexity, and information rate.

The techniques described herein relate to a selected mapping (SLM) approach which was first proposed by R. W. Bäuml, R. F. H. Fischer and J. B. Huber in "Reducing the peak-to-average power ratio of multicarrier modulation by selected mapping," *Elec. Lett.*, vol. 32, no. 22, pp. 2056-2057, October 1996. SLM is distortionless and offers moderate to significant amount of CFR. Denote by $\phi_k^{(m)}$ $0 \le k \le N$, $0 \le m \le M-1$, a set of M (random) phase sequences of length N each. In SLM, the phases of X[k] is rotated as described by $$Z^{(m)}[k] = X[k] e^{j\phi_k^{(m)}}. \quad (3)$$

It is clear that $Z^{(m)}[k]$ and $X[k]$ contain the same information, but their time-domain counterparts $z^{(m)}(t)$ and $x(t)$ can have very different PAR values. From the M candidate $z^{(m)}(t)$ signals, $z^{(\overline{m})(t)}$, which has the lowest PAR, is transmitted. The index $\overline{m}$ ($\log_2 M$ bits) may be transmitted as side information, which is of critical importance to the receiver for decoding and is generally protected by channel coding discussed by R. W. Bäuml, R. F. H. Fischer and J. B. Huber, in "Reducing the peak-to-average power ratio of multicarrier modulation by selected mapping," *Elec. Lett.*, vol. 32, no. 22, pp. 2056-2057, October 1996.

If $\{\phi_k^{(m)}\}$ are independent identical distributed (i.i.d.) satisfying $E[e^{j\Phi_k^{(m)}}]=0$, then the best SLM performance can be achieved; the corresponding complementary cumulative distribution function (CCDF) is given by $$Pr\{PAR[z^{(\overline{m})}(t)]>\gamma\}=[Pr\{PAR(x(t))>\gamma\}]^M. \quad (4)$$

The simplest and yet optimal phase rotation table is one that has 0 and $\pi$ entries with equal probability. In that case, no multiplication is necessary in equation (3) since $e^{j0}=1$ and $e^{j\pi}=-1$. The phase rotation table is pre-determined and is stored at both the transmitter and the receiver, so real-time optimization of the phase sequence is not necessary.

To avoid the information rate loss caused by the transmission of the optimum phase sequence index $\overline{m}$, a few blind SLM schemes have been proposed. In a paper by M. Breiling, S. H. Muller-Weinfurtner, and J. B. Huber, entitled "SLM peak-power reduction without explicit side information," *IEEE Commun. Lett.*, vol. 5, no. 6, pp. 239-241, June 2001, a scrambling technique was described. A $\log_2$ M-bit binary label is inserted as a prefix to the frequency-domain OFDM signal and passed through a scrambler. Since the selected label is used in the receiver implicitly during descrambling, an erroneous reception of the label bits does not affect the error performance. In a paper by A. D. S. Jayalath and C. Tellambura, entitled "A blind SLM receiver for PAR-reduced OFDM," in *Proc. IEEE Vehicular Technology Conference—Fall*, vol. 1, pp. 219-222, September 2002, a blind SLM receiver was proposed by employing a maximum likelihood (ML) decoder, which avoids the transmission of any side information. However, the complexity and the error rate of the ML decoder are rather high as we will show in the simulation section.

In OFDM, channel state information (CSI) can be acquired by modulating pilot tones onto predetermined sub-carriers; this is called pilot tone assisted modulation (PTAM), discussed by R. Negi and J. Cioffi, in "Pilot tone selection for channel estimation in a mobile OFDM system," *IEEE Trans. Consumer Electron.*, vol. 44, pp. 1122-1128, August 1998, and S. Ohno and G. B. Giannakis, in "Optimal training and redundant precoding for block transmissions with application to wireless OFDM," *IEEE Trans. Commun.*, vol. 50, no. 12, pp. 2113-2123, December 2002.

The concept of joint channel estimation and CFR was explored by M. J. Fernández-Getino García, O. Edfors and J. M. Páez-Borrallo, in "Joint channel estimation and peak-to-average power reduction in coherent OFDM: a novel approach," *Proc. IEEE Vehicular Technology Conference—Spring*, vol. 2, pp. 815-819, May 2001. The "diversity" offered by the pilot phase (as opposed to the pilot location—the focal point of the present method) was exploited and the transmission of side information was assumed by García et al.

It would be desirable to have an improved selected mapping CFR technique that avoids the transmission of any side information and entails a very accurate detection scheme in the receiver.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 illustrates an exemplary blind selected mapping system;

FIG. 2 illustrates a reduced-to-practice blind selected pilot tone modulation (BSPTM) transmitter;

FIG. 3 illustrates a reduced-to-practice BSPTM receiver;

DETAILED DESCRIPTION

Figure 4:
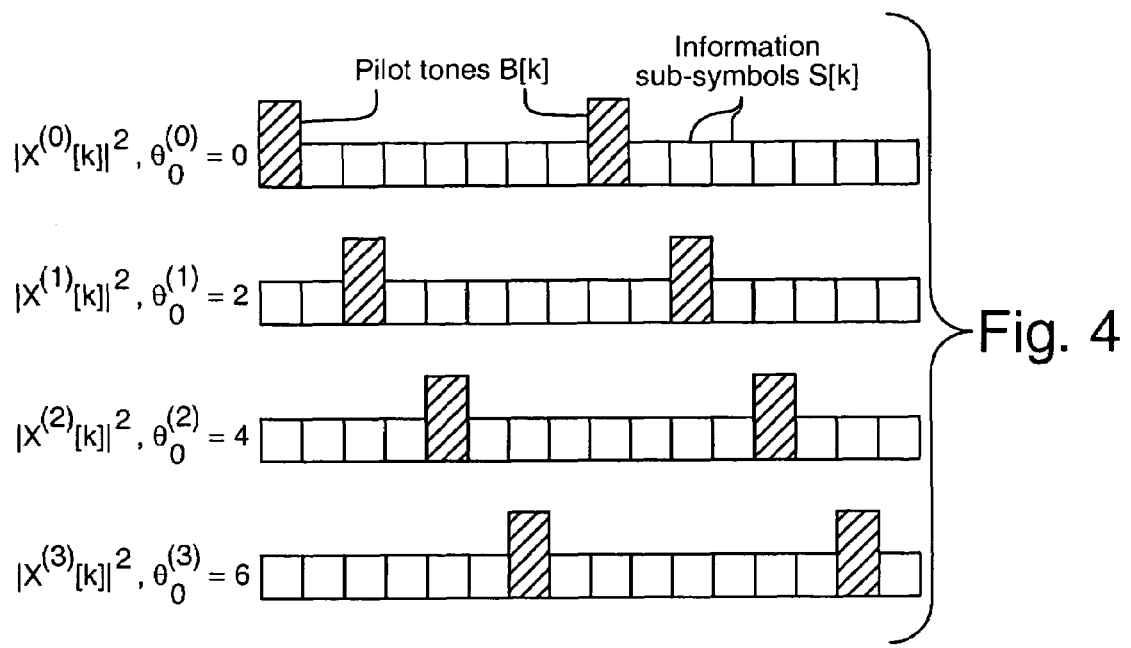
FIG. 4 illustrates exemplary scenarios for shifting the pilot tones in a BSPTM transmitter.

Disclosed herein are a novel crest factor reduction (CFR) technique and apparatus that provide for orthogonal frequency division multiplexing (OFDM) systems using blind selected pilot tone modulation. The technique combines the merits of PTAM and SLM, and is implemented using a novel joint channel estimation and crest factor reduction algorithm. Instead of fixing the pilot tone locations as in conventional PTAM, different pilot tone locations are employed, and movement of the pilot tones is synchronized with the choice of phase rotation sequence. The pilot tone/phase sequence combination that results in the lowest PAR of the time-domain signal is used for transmission. However, the optimum index is not transmitted as side information in order to maintain the information rate. At the receiver, by taking advantage of the disparity between the pilot tone and information signal powers, the optimum index is blindly detected by resorting to simple frequency-domain averages. A reduced-to-practice implementation of the technique using the blind selected pilot tone modulation is discussed in detail, along with a more generic framework not specifically linked to the use of pilot tones.

In order to better understand the present approach, the PTAM technique is reviewed for OFDM, and the blind selected pilot tone modulation (BSPTM) technique is described. Computer simulations are described that demonstrate the impressive CFR capacity of the algorithm and its robust BER performance over frequency selective fading channels.

Review of PTAM-OFDM

A conventional OFDM transmitter processes a frequency domain signal $X[k]$ that is to be transmitted using an inverse discrete Fourier transform (IDFT) circuit, an upsampling circuit, and a digital-to-analog (D/A) converter. The analog signal output by the D/A converter is input to a power amplifier for transmission by way of a wireless (or wired) channel. A conventional OFDM receiver processes the analog signal received over the wireless (or wired) channel. An analog-to-digital (A/D) converter converts the analog signal to a digital one and couples it to a discrete Fourier transform (DFT) circuit. The output of the discrete Fourier transform circuit is processed by a channel estimator. The output of the channel estimator is processed by symbol detection circuitry that outputs an estimate of the frequency domain signal transmitted by the transmitter.

In the OFDM transmission system with PTAM, P pilot tones are inserted in the frequency domain in order to acquire the channel state information (CSI); $P \geq L$ is assumed where L is the length of the finite impulse response (FIR) channel. The transmitted frequency domain signal can be described by $X[k]=B[k]$ for $k \in \Omega_0$ and $X[k]=S[k]$ for $k \in \Omega_0^{195}$, where $\Omega_0$ is the set of the P pilot tone indices in ascending order, $\Omega_0^\perp$ denotes the complement of $\Omega_0$ (i.e., the set of N–P information sub-symbol indices in ascending order), $\{B[k]\}_{k \in \dot{U}_0}$ are the pilot tones, and $\{S[k]\}_{k \in \dot{U}_0^\perp}$ are the frequency-domain information sub-symbols.

According to S. Ohno and G. B. Giannakis, in "Optimal training and redundant precoding for block transmissions with application to wireless OFDM," *IEEE Trans. Commun.*, vol. 50, no. 12, pp. 2113-2123, December 2002, the optimal way to place the pilot tones is to modulate P=L pilot tones with equal power onto equi-spaced sub-carriers. For simplicity, it is assumed that the number of sub-carriers N is an integer multiple of P; i.e., R=N/P is an integer. Define a set of P equi-spaced pilot tone indices as $$\Omega_0 = \Delta\{k_i | k_i = iR + \theta_0, 0 \leq i \leq P-1, 0 \leq \theta_0 \leq R-1\}, \quad (5)$$

which may be characterized by $\theta_0$ alone.

At the receiver of the OFDM transmission system, after removing the cyclic prefix and performing a DFT, a set of N linear equations in the frequency domain is obtained $$Y[k] = X[k]H[k] + V[k], \quad (6)$$
$$k = 0, 1, \ldots, N-1,$$

where $$Y[k] = \frac{1}{\sqrt{N}} \sum_{n=0}^{N-1} y[n] e^{-j2\pi \frac{kn}{N}}$$

and $$V[k] = \frac{1}{\sqrt{N}} \sum_{n=0}^{N-1} v[n] e^{-j2\pi \frac{kn}{N}}$$

are the normalized DFT of the received signal y[n] (after the removal of the cyclic prefix) and the zero-mean additive noise v[n], respectively, and $$H[k] = \sum_{n=0}^{L-1} h[n] e^{-j2\pi \frac{kn}{N}}$$

is the frequency response of the composite channel (the convolution of the transmit filter, the frequency selective channel, and the receive filter).

Since $X[k]=B[k]$ for $k \in \dot{U}_0$, an estimate of H[k] at P points of $\dot{U}_0$ <sup>obtained from equation</sup> (6):

$$\hat{H}[k] = \frac{Y[k]}{B[k]}, \quad (7)$$
$$k \in \Omega_0.$$

Since H[k] is constrained by P parameters $\{h[n]\}_{n=0}^{P-1}$, H[k] can be estimated at any k. Afterwards, the information sub-symbols can be estimated as $$\hat{S}[k] = \frac{Y[k]}{\hat{H}[k]}, \quad (8)$$
$$k \in \Omega_0^+,$$

which are then decoded to yield the $\overline{S}[k]$ estimates belonging to the symbol constellation.

Blind Selected Pilot Tone Modulation

The blind selected pilot tone modulation (BSPTM) technique described below is a combination of channel sounding and effective crest factor reduction, at a low computational cost. The BSPTM technique may be advantageously employed in a mobile communication system comprising a blind selected pilot tone modulation (BSPTM) transmitter 20 and a blind selected pilot tone modulation receiver 30. Referring to the drawing figures, FIG. 1 illustrates an exemplary blind selected mapping (BSLM) system 10. FIG. 2 illustrates an exemplary educed-to-practice blind selected pilot tone modulation (BSPTM) transmitter 20, and FIG. 3 illustrates an exemplary reduced-to-practice BSPTM receiver 30.

More particularly, FIG. 1, illustrates an exemplary generic BSLM communication system 10. The generic BSPTM system 10 comprises a BSLM transmitter 11 and a BSLM receiver 12. The BSLM transmitter 10 processes a frequency domain signal X[k] that is to be transmitted over a wireless channel using a tagging process 21 that uniquely identifies each block of data in a plurality of sub-channels. The signal output of the tagging process-21 is then transformed by way of a differentiating process 22 that is used to differentiate the blocks of data in each of the plurality of sub-channels. The differentiating process 22 comprises an invertible transform for generating different sub-channel signals. Each of the blocks of data in each of the plurality of sub-channels is then conventionally processed by an inverse discrete Fourier transform (IDFT) 11, and is upsampled 12. The blocks of data in each of the plurality of sub-channels are then summed and processed 23 to select the channel (or block of data) having the minimum crest factor (CF), or peak-to-average power ratio (PAR). The block of data in the selected sub-channel is then transformed to an analog signal using a digital-to-analog (D/A) converter 13. The analog signal output by the D/A converter 13 is input to a power amplifier 14 for transmission over the wireless channel to the receiver 30.

At the receiver 30, the received block of data is digitized using an analog-to-digital converter 15 and is transformed to the frequency domain using a discrete Fourier transform (DFF) circuit 16. The tag generated by the tagging process 21 in the transmitter 20 is then detected using a tag detector 24. This identifies the sub-channel that was used to transmit the block of data. Then, a channel estimator 17 estimates the effects of the wireless channel, and this signal is processed by a symbol detector 17 that outputs an estimate $\hat{X}[k]$ of the frequency domain signal transmitted by the transmitter 20.

With the above in mind, a reduced-to-practice implementation of the technique using blind selected pilot tone modulation will now be discussed.

Referring to FIG. 2, an exemplary reduced-to-practice BSPTM transmitter 20 processes the frequency domain signal X[k] using a tagging process 21 that shifts pilot tones associated with the blocks of data in each of the plurality of sub-channels. The blocks of data output by the tagging process 21 are processed using the differentiating process 22 to separately rotate the phases of each signal in the block of data. The differentiating process 22 may comprise a lookup table 26 containing a plurality of pseudo-random phase sequences that are used to rotate the phases of the frequency domain signal X[k] in the sub-channels. The combination of the tagging process 21 and differentiating process 22 uniquely identify each block of data and each sub-channel.

The individual phase rotated sub-channels (blocks of data) are each inverse discrete Fourier transformed 11 and upsampled 12. Each of the inverse Fourier transformed and upsampled sub-channels are then summed and processed 23 to select the sub-channel (block of data) having the minimum crest factor (CF), or peak-to-average power ratio (PAR). In particular, the sub-channels are processed using a crest factor selection algorithm that selects the signal having the minimum crest factor. The selected signal (sub-channel) having the minimum crest factor is converted to an analog signal by a digital-to-analog (D/A) converter 13 and input to a power amplifier 14 for transmission over the channel.

As is shown in FIG. 3, an exemplary reduced-to-practice BSPTM receiver 30 comprises an analog-to-digital (A/D) converter 15 that converts a received analog signal into a digital signal corresponding to the sub-channel that was transmitted. The digital signal is discrete Fourier transformed 16. The discrete Fourier transformed signal is processed by a peak power detector 24 that detects the peaks in it, thus identifying the shift of the pilot tones as well as the associated sub-channel that was transmitted. The peak power detector 24 outputs an index ($\overline{m}$) that is indicative of the phase rotation used in the differentiating process 22 used in the transmitter 20. The lookup table 26 outputs the $\overline{m}$ th phase sequence for the consequent inverse phase rotation. The discrete Fourier transformed signal is then inverse phase rotated 25 by using the output phase sequence from the lookup table 26. The channel estimator 17 estimates the communications channel based on the pilot tones. The output of the channel estimator 17 is processed by a symbol detector 18 to produce an estimate of the frequency domain signal transmitted by the transmitter 20.

Implementation details regarding the reduced-to-practice transmitter 20 and receiver 30 will be discussed below.

Disparity in the Pilot and Information Signal Powers

An interesting feature of PTAM is that the pilot tones generally have stronger average power than the information sub-symbols, and this forms the basis of the blind selected pilot tone modulation technique.

Denote $\beta$, as the power allocation factor, which is the ratio between the total power allocated to the pilot tones and the total transmitted power; i.e., $$\beta = \frac{P\sigma_p^2}{P\sigma_p^2 + (N-P)\sigma_s^2}. \tag{9}$$

where $$\sigma_p^2 = 1/P \sum_{k \in U_0} |B[k]|^2$$

is the average power of the pilot tones and $\sigma_s^2$ is the variance of S[k]; i.e., $\sigma_s^2 = E|S[k]|^2$.

When the pilot tones are equi-powered; i.e., $|B[k]|^2 = \sigma_p^2$, $\forall$ $k \in \Omega_0$, an optimal $\beta$ was determined by S. Ohno and G. B. Giannakis, in "Optimal training and redundant precoding for block transmissions with application to wireless OFDM," *IEEE Trans. Commun.*, vol. 50, no. 12, pp. 2113-2123, December 2002 as $$\beta = 1 - \frac{1}{1 + \sqrt{\frac{1}{N/P - 1}}} \tag{10}$$

by minimizing the mean squared error (MSE) of the source estimates $\hat{S}[k]$, $k \in \Omega_0^{\perp}$. Combining equations (9) and (10), $$\frac{\sigma_p^2}{\sigma_s^2} = \sqrt{\frac{N}{P} - 1} \tag{11}$$

which depends on N/P only. Since N>>P, the pilot tones have much stronger power than the information sub-symbols. For example, for P≦16 and N≧160, (11) gives rise to $\sigma_p^2/\sigma_s^2 \leq 3$. On the other hand, if P≦8 and N≧296, then $\sigma_p^2/\sigma_s^2 \geq 6$. Both are realistic scenarios.

The $\sigma_p^2/\sigma_s^2 >> 1$ relationship helps to detect the pilot tone location parameter $\theta_0$, which will be described later.

Crest Factor Reduction (CFR) Using BSPTM

According to S. Ohno et al., as long as the pilot tones are equi-powered and equi-spaced and the additive noise is white, channel estimation performance is not affected by the choice of $\theta_0$. Therefore, instead of using a pre-selected $\theta_0$, different frequency shifts $\theta_0^{(m)}$ may be tried for the pilot tones. One aspect of the blind selected pilot tone modulation approach is to tie the location of the pilot tones to the different phase rotation sequences. This enables crest factor reduction without the transmission of side information.

Recall that m is used to index the rows of the phase rotation table. Use the same m to index the M candidate frequency shifts for the pilot tones; i.e., $$\theta^{\Delta} = \{\theta_0^{(0)}, \theta_0^{(1)}, \ldots, \theta_0^{(m)}, \ldots, \theta_0^{(M-1)}\}. \tag{12}$$

The maximum number of distinct pilot tone locations is R=N/P, in which case $\{\theta_0^{(0)}=0, \theta_0^{(1)}=1, \ldots, \theta_0^{(R-1)}=R-1\}$. However, since R can be quite large and for practical reasons, M does not need to be greater than 8, for example, there is some flexibility in designating è. For example, if R=8 and M=4, then $\{\theta_0^{(0)}=0, \theta_0^{(1)}=2, \theta_0^{(2)}=4, \theta_0^{(3)}=6\}$ (see FIG. 4) or $\{\theta_0^{(0)}=0, \theta_0^{(1)}=1, \theta_0^{(2)}=3, \theta_0^{(3)}=7\}$, and so on. FIG. 4 illustrates exemplary scenarios for $X^{(m)}[k]$ with N=16, P=2, M=4. The M delays are preferably equally-spaced in order to minimize the detection error in $\overline{m}$; i.e., the possible pilot shifts are $\{\theta_0^{(0)}=0, \theta_0^{(1)}=R/M, \ldots, \theta_0^{(M-1)}=R(M-1)/M\}$. In addition, both the transmitter 20 and the receiver 30 should have the knowledge of $\theta$.

In the blind selected pilot tone modulation approach, the mth PTAM-OFDM signal is given by $$X^{(m)}[k] = \begin{cases} B[k], & k \in \Omega_0 \\ S[k], & k \in \Omega_0^\perp \end{cases} \quad (13)$$

where $0 \leq k \leq N-1$, $0 \leq m \leq M-1$, and $\Omega_m$ is characterized by $\theta_0^{(m)}$ similar to the way that $\Omega_0$ is characterized by $\theta_0$.

Next, phase rotations are performed $$Z^{(m)}[k] = X^{(m)}[k] e^{j\phi_k^{(m)}}. \quad (14)$$

Similar to SLM, $z^{(m)}(t)$ and $PAR(z^{(m)}(t))$ are evaluated and $z^{(\bar{m})}(t)$, which has the lowest PAR among $\{z^{(m)}(t)\}$, is transmitted. In other words, the optimum pilot tone location—phase sequence index is $$\bar{m} = \arg\min_{0 \leq m \leq M-1} \{PAR(z^{(m)}(t))\}. \quad (15)$$

Based on the results of S. Wei, D. L. Goeckel, and P. A. Kelly, in "The complex envelope of a bandlimited OFDM signal converges weakly to a Gaussian random process: proof and application," http://www.ece.Isu.edul/swei, for example, it can be shown that the CCDF of the PAR of the transmitted BSPTM-OFDM signal $z^{(\bar{m})}(t)$ is given by $$Pr\{PAR(z^{(\bar{m})}(t)) > \gamma\} = \left[1 - e^{-e^{-\gamma} N \sqrt{\frac{\tilde{\lambda}}{N} \log N}}\right]^M, \quad (16)$$

where $$\tilde{\lambda} = 4\frac{\pi^2}{3} - \pi^2\left(1 - \frac{\beta}{P}\right)^2.$$

Blind Detection of $\bar{m}$

At the receiver 30, the optimum index $\bar{m}$ must be determined. Replace the $X[k]$ in equation (6) by the $Z^{(\bar{m})}[k]$ of equation (14) and write:

$$Y[k] = Z^{(\bar{m})}[k] H[k] + V[k] \quad (17)$$

$$= \begin{cases} B[k] e^{j\phi_k^{(\bar{m})}} H[k] + V[k], & k \in \Omega_{\bar{m}} \\ S[k] e^{j\phi_k^{(\bar{m})}} H[k] + V[k], & k \in \Omega_{\bar{m}}^\perp \end{cases}$$

The task here is to detect $\theta_0^{(\bar{m})}$ (or equivalently, $\bar{m}$) from $\{Y[k]\}_{k=0}^{N-1}$, knowing the candidate set of locations in $\theta$.

The following assumptions are used in the description below:

1. $s[n]$, $v[n]$, and $h[n]$ are mutually independent,
2. $h[n]$ is i.i.d. zero-mean with variance $\sigma_h^2$, and
3. $|B[k]|^2 \sigma_p^2$ is constant $\forall k \in \Omega_{\bar{m}}$ (equi-powered pilots).

From assumption 2, it is inferred that $H[k]$ has mean zero and variance $L\sigma_h^2$, $\forall k$. Furthermore: $\sigma_s^2 = E|S[k]|^2$ and $\sigma_v^2 = E|V[k]|^2$. It follows from equation (17) that $$E|Y[k]|^2 = \begin{cases} \sigma_p^2(L\sigma_h^2) + \sigma_v^2, & k \in \Omega_{\bar{m}} \\ \sigma_s^2(L\sigma_h^2) + \sigma_v^2, & k \in \Omega_{\bar{m}}^\perp \end{cases} \quad (18)$$

Next, let $k = iR + r$, where $0 \leq i \leq P-1$ and $0 \leq r \leq R-1$, and denote by $Y_i[r] = Y[iR+r]$ the ith sub-record (of length-R) of $Y[k]$. It follows from equation (18) that $$\rho[r] = \frac{1}{P} E\left[\sum_{i=0}^{P-1} |Y_i[r]|^2\right] = \begin{cases} \sigma_p^2(L\sigma_h^2) + \sigma_v^2, & r = \theta_0^{(\bar{m})} \\ \sigma_s^2(L\sigma_h^2) + \sigma_v^2, & r \neq \theta_0^{(\bar{m})} \end{cases} \quad (19)$$

Since $\sigma_p^2 > \sigma_s^2$, it is inferred from equation (19) that $$\theta_0^{(\bar{m})} = \arg\max_{r \in \hat{e}} \{\rho[r]\} \quad (20)$$

In practice, estimate $\rho[r]$ as $$\hat{\rho}[r] = \frac{1}{P} \sum_{i=0}^{P-1} |Y_i[r]|^2, \quad (21)$$

and find the optimum pilot location via $$\hat{\theta}_0^{(\bar{m})} = \arg\max_{r \in \hat{e}} \{\hat{\rho}[r]\} \quad (22)$$

Since the receiver has the knowledge of $\theta$, from $\hat{\theta}_0^{(\bar{m})}$, a simple lookup table search yields $\bar{m}$.

Even if $|H[iR+r]|^2 \geq 0$ exhibits a deep null at $r = \theta_0^{(\bar{m})}$ for a particular sub-record i, since P sub-records are involved in the averaging in equation (21) and $\sigma_p^2 >> \sigma_s^2$, $\hat{\rho}[r]$ is still likely to peak at $r = \theta_0^{(\bar{m})}$. The side information $\bar{m}$ is critical for decoding at the receiver 30. If $\bar{m}$ is inaccurate for a particular OFDM block, the BER will be high for that block. The finite alphabet nature of $\hat{e}$ makes it less likely for errors to occur in $\theta_0^{(\bar{m})}$. When the SNR is so low that $\sigma_v^2$ dominates the other terms on the RHS of equation (19), $\rho[r]$ at $r = \theta_0^{(\bar{m})}$ and $\rho[r]$ at $r \neq \theta_0^{(\bar{m})}$ become less distinguishable, and hence accurate detection of $\bar{m}$ becomes difficult. As is shown in simulations discussed below, at medium to high SNR levels, the detector in equation (22) performs quite reliably, especially when $\sigma_p^2/\sigma_s^2$ is high.

Simulations

In the examples below (except when specified otherwise), it is assumed that the number of sub-carriers $N=128$, the length of the FIR channel $L=4$, the number of pilot tones $P=L=4$, and the power allocation factor $\beta=0.15$ (c.f. (10)). Except for the discussion of the blind detection of $\bar{m}$, the phase table includes independent identical distributed (i.i.d.) $\{0, \pi\}$ entries with equal probability; in other words, a $\{e^{j\Phi_k^{(m)}}\}$ table containing i.i.d. $\{1, -1\}$ entries with equal probability.

Such a sign change table is predetermined and is stored at both the transmitter 20 and the receiver 30. The N−P information sub-symbols are independently drawn from a QPSK constellation with Gray coding. Under the unit channel energy constraint $$\sum_{n=0}^{L-1} E|h[n]|^2 = 1,$$

the signal-to-noise ratio (SNR) is defined as $$SNR = \frac{P_{dc}}{\sigma_v^2}, \quad (23)$$

where $P_{dc}$ is the total amount of DC power consumed by the power amplifier 14 and $\sigma_v^2$ is the variance of the additive white Gaussian noise. The effective SNR, which directly affects the BER, may be expressed as $SNRe = P_t/\sigma_v^2$, where $P_t$ is the average output power of the power amplifier 14 with the input signal $z^{(m)}(t)$. If an ideal linear power amplifier 14 is used and the signal is to be amplified undistorted, $P_t$ is proportional to $P_{dc}/PAR$ if linear scaling is employed as described by Ochiai (3002). Therefore, $SNRe \propto P_{dc}/PAR$, and the benefit of effective crest factor reduction is realized as an increase in SNRe.

CFR Performance In this example, approximate the continuous-time PAR of equation (2) by evaluating the discrete-time PAR of the 8-times oversampled OFDM signal discussed by J. Tellado (2000). $10^6$ independent Monte Carlo trials were conducted.

Figure 5:
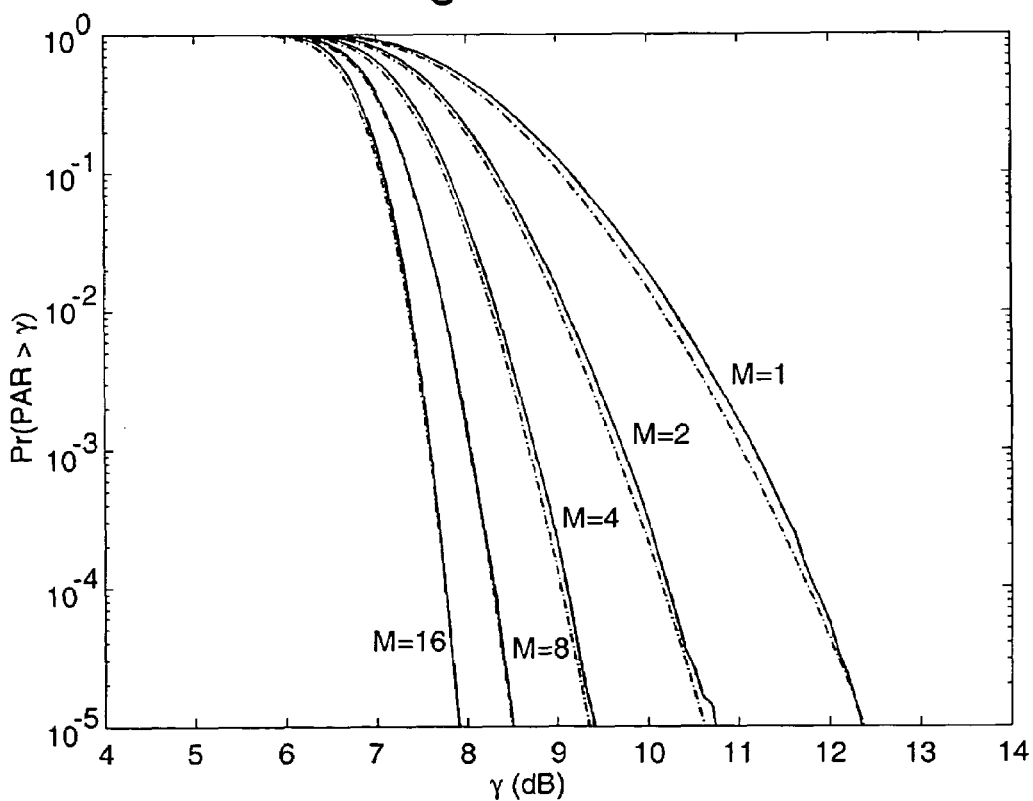
FIG. 5 is a graph that demonstrates the CFR capability of BSPTM.

FIG. 5 shows empirical CCDF curves (solid lines) of the PAR of the transmitted signal $z^{(m)}(t)$ for different number of selections, M, along with the theoretical CCDFs (dash-dotted lines) obtained from (16). M=1 corresponds to the original PTAM-OFDM case. FIG. 5 shows that the empirical and the theoretical CCDFs are quite close. It is observed that when M=8, the proposed algorithm could achieve 3.5 dB of PAR reduction (as compared with the M=1 case) at the CCDF level of $10^{-4}$. It is also seen from FIG. 5 that the larger the M, the smaller the resulting PAR. On the other hand, the computational complexity increases as M increases. There is also a diminishing return in the effective crest factor reduction capability as M further increases. As a rule of thumb, it is desirable to use min{R, 4}≦M≦min{R, 8}.

Blind Detection of $\overline{m}$

Figure 6:
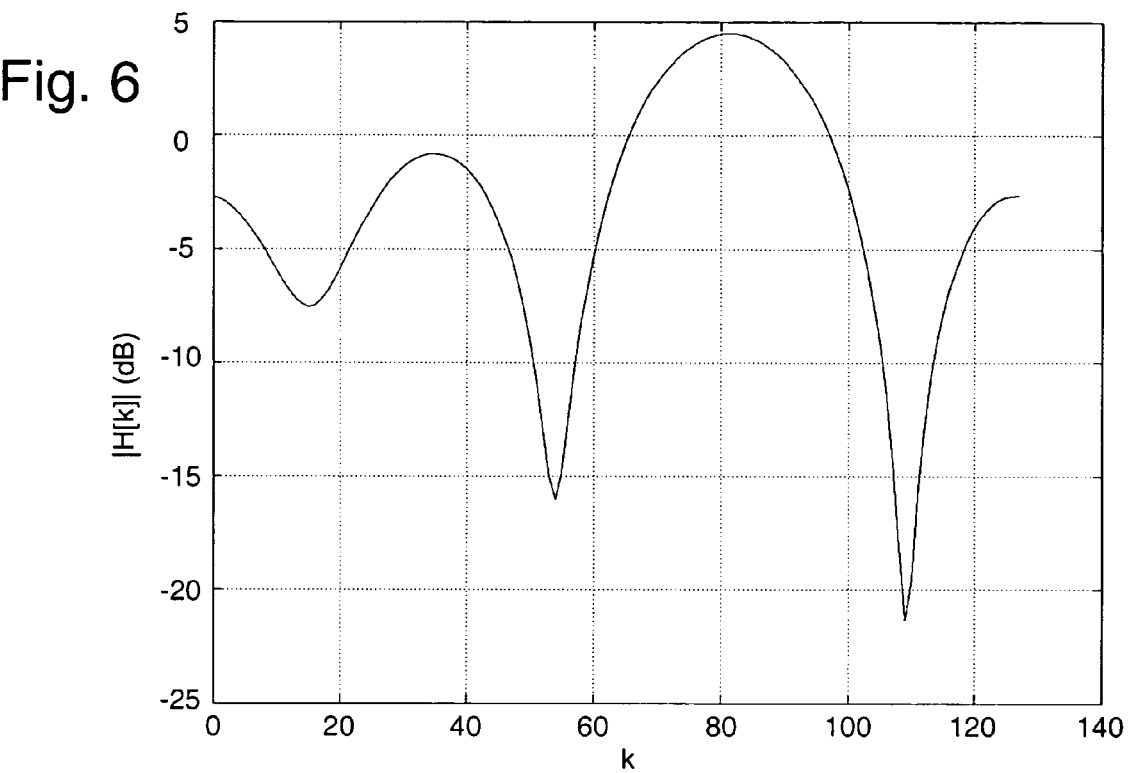
FIG. 6 is a graph that illustrates the magnitude response for the specific channel realization whose realization response is given by equation (24)
Figure 7:
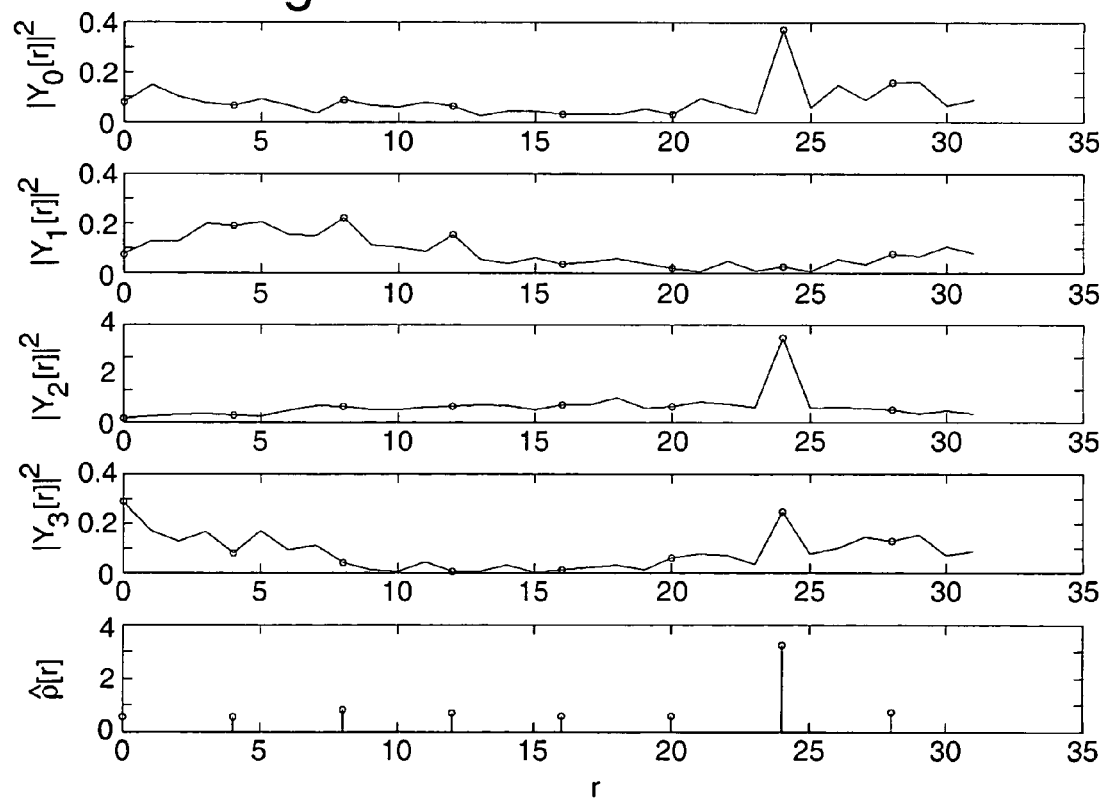
FIG. 7 demonstrates the robustness of the peak power detector in the presence of the frequency selective fading channel depicted in FIG. 6.

Below is an example that illustrates the blind detection of $\overline{m}$ from $|Y[k]|^2$. In this example, SNR =0 dB, R=32, $\grave{e}$={0, 4, 8, 12, 16, 20, 24, 28}, and thus M=8. The channel taps are assumed to be i.i.d. complex Gaussian distributed with zero-mean and variance $\sigma_h^2 = 1/L$ (i.e., Rayleigh fading), and L=4. FIG. 6 shows $|H[kj]|$ vs. k for one realization of the Rayleigh fading channel with time-domain coefficients $$h = [0.2774 - j0.4545, -0.4988 + j0.1837, 0.1189 + j0.1105, -0.0751 - j0.6340]^T, \quad (24)$$

which exhibits several deep nulls in the frequency domain. Table 1 shows the PAR$\{z^{(m)}(t)\}$ values for one particular OFDM block, with $0 \leq m \leq 7$. It is observed that m=6 corresponds to the lowest PAR value, thus the optimum pilot tone location parameter was $\theta_0^{(6)} = 24$. At the receiver 30, calculate $|Y[k]|^2$. In FIG. 7, for each sub-record $|Y_r[r]|^2$, circles indicate the values corresponding to the M candidate locations $r \in \theta$.

From the $\hat{\rho}[r]$ plot, $\hat{\theta}_0^{(\overline{m})} = 24$ (or equivalently, $\overline{m} = 6$), which was indeed the true $\hat{\theta}_0^{(\overline{m})}$ that was used during transmission.

TABLE 1

PAR$\{z^{(m)}(t)\}$ for one OFDM symbol, $0 \leq m \leq 7$.

| | m | | | | | | | |
|---|---|---|---|---|---|---|---|---|
| | 0 | 1 | 2 | 3 | 4 | 5 | 6 | 7 |
| PAR (dB) | 7.44 | 7.33 | 10.34 | 8.11 | 8.55 | 8.03 | 6.69 | 7.36 |

To illustrate the performance on the blind detection of m, Table 2 lists detection error rates for varying values of β, M, and SNR, calculated by averaging over $10^5$ Monte Carlo trials. It is evident from Table 2 that the larger the β, the smaller the error rate. This is because when β is larger, ρ[r] of equation (19) stands out better at $r = \theta_0^{\overline{m}^d}$. Moreover, it is observed from Table 2 that the larger the M, the higher the error rate in detecting $\theta_0^{(\overline{m})}$. This is because there are more competing candidate m's when M is larger. When β is not too small (e.g., β>0.1), the error rate can be quite small for SNR >0 dB. However, β cannot be too large either, since when too much power is devoted to the pilot tones instead of the information sub-symbols, the receiver 30 becomes vulnerable to channel distortions and additive noise.

TABLE 2

Error rates in detecting $\overline{m}$ for varying β, M, and SNR.

| | | SNR | | | | | | |
|---|---|---|---|---|---|---|---|---|
| | | 0 dB | 5 dB | 10 dB | 15 dB | 20 dB | 25 dB | 30 dB |
| M = 4 | β = 0.1 | 16.38% | 2.28% | 0.07% | 0% | 0% | 0% | 0% |
| M = 4 | β = 0.2 | 2.15% | 0.06% | 0% | 0% | 0% | 0% | 0% |
| M = 4 | β = 0.3 | 0.42% | 0.01% | 0% | 0% | 0% | 0% | 0% |
| M = 8 | β = 0.1 | 23.99% | 3.38% | 0.13% | 0% | 0% | 0% | 0% |
| M = 8 | β = 0.2 | 2.99% | 0.10% | 0.004% | 0% | 0% | 0% | 0% |
| M = 8 | β = 0.3 | 0.68% | 0.01% | 0% | 0% | 0% | 0% | 0% |
| M = 16 | β = 0.1 | 31.35% | 4.96% | 0.22% | 0% | 0% | 0% | 0% |
| M = 16 | β = 0.2 | 4.09% | 0.15% | 0.004% | 0% | 0% | 0% | 0% |
| M = 16 | β = 0.3 | 0.90% | 0.01% | 0% | 0% | 0% | 0% | 0% |

Comparison with A. D. S. Jayalath et al. (2002) on the detection of $\overline{m}$ In this example, the performance of the blind selected pilot tone modulation technique is compared with that described by A. D. S. Jayalath and C. Tellambura, in "A blind SLM receiver for PAR-reduced OFDM," in *Proc. IEEE Vehicular Technology Conference—Fall*, vol. 1, pp. 219-222, September. 2002 in the presence of Rayleigh fading. The simulation parameters were the same as in the previous example, except that the phases $\{\phi_k^{(m)}\}$ were i.i.d. uniformly distributed in $[-\pi, \pi)$ (the method of Jayalath et al. (2002) does not work when the phases have a discrete distribution). The maximum likelihood (ML) decoder described by Jayalath et al. needs the channel state information (CSI) in order to detect the optimum phase sequence index $\overline{m}$, but the blind selected pilot tone modulation technique does not. Table 3 compares the error rates in detecting $\overline{m}$ between the method described by Jayalath et al. and the blind selected pilot tone modulation technique. Perfect CSI was assumed for the Jayalath et al. method, but no CSI power for the blind selected pilot tone modulation technique. Despite the favorable setup for the Jayalath, et al. method, the blind selected pilot tone modulation technique is clearly more robust.

TABLE 3

Error rate in detecting m when N = 128, P = 4, M = 8, β = 0.15.

| | SNR | | | |
|---|---|---|---|---|
| | 0 dB | 5 dB | 10 dB | 20 dB |
| ML in Jayalath et al. (2002) | 35.28% | 5.02% | 0.46% | 0.02% |
| BSPTM | 1.42% | 0.09% | 0% | 0% |

Moreover, the ML decoder of Jayalath et al. (2002) has a higher computational complexity than the BSPTM technique. For example, if the frequency-domain OFDM sub-symbols are drawn from a 16-QAM constellation, the ML decoder requires 16MN magnitude-squared ($|.|^2$) operations, whereas the BSPTM technique only needs N of them.

BER Performance

The BER performance of BSPTM-OFDM is now compared to that of PTAM-OFDM for N=128, P=4, β=0.15, and M=8. The receiver uses a zero-forcing equalizer and a sub-optimal but simple hard-decision decoder discussed by S. Ohno et al. Similar to S. Ohno et al., two types of channels were used: a fixed FIR channel with tap coefficients in equation (24) and a Rayleigh fading channel with i.i.d. complex Gaussian taps. The BER was evaluated by averaging over $10^5$ Monte Carlo trials.

Figure 8:
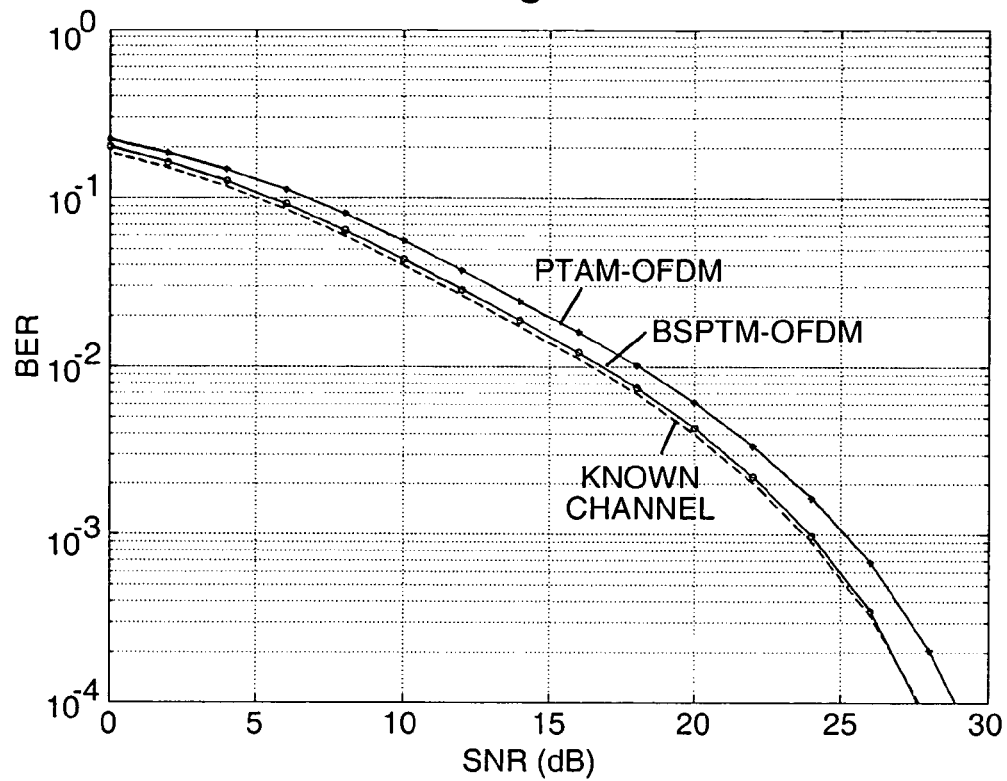
FIG. 8 illustrates BSPTM-OFDM outperforms the conventional PTAM-OFDM in term of bit error rate (BER) for the fixed channel (given by equation (24))
Figure 9:
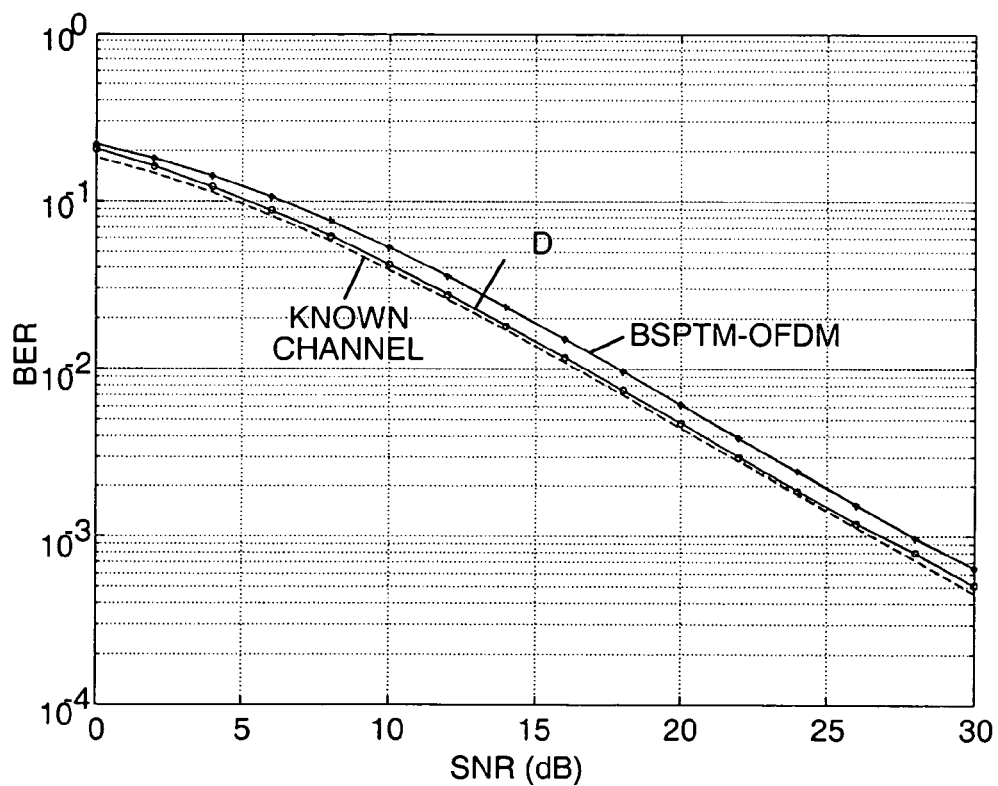
FIG. 9 illustrates BSPTM-OFDM outperforms the conventional PTAM-OFDM in term of BER for the Rayleigh channel.

FIG. 8 shows the BER performance of the blind selected pilot tone modulation technique and that of PTAM-OFDM for the fixed channel case. FIG. 9 shows a similar comparison for the Rayleigh fading case. It can be seen from both FIGS. 8 and 9 that the PTAM-OFDM performance is only 1-2 dB away from the known channel case, which serves as a benchmark. However, the BSPTM-OFDM method offers even better BER performance, which approaches the performance of the known channel case for both the fixed and the Rayleigh fading channels. Such superior performance is possible, since the reduction in the PAR has been used to boost the average transmission power for the same amount of DC power. Specifically, the peak power of an OFDM block has been kept fixed, but the average power has been adjusted according to the actual PAR value of the block. This linear scaling approach described by H. Ochiai et al. ensures the most efficient utilization of the power amplifier; in other words, the average transmit power is made proportional to $P_{dc}/PAR$. Eventually, the benefit of effective crest factor reduction is realized as a decrease in the BER.

Thus, combining the frameworks of pilot tone assisted modulation (PTAM) for OFDM and selected mapping (SLM), a novel joint channel estimation and crest factor reduction scheme, has been described, referred to as blind selected pilot tone modulation (BSPTM). The index for SLM is carried by the location of the pilot tones, which can be blindly detected at the receiver by capitalizing on the average power disparity between the pilot tones and the information sub-symbols. Since no side information needs to be transmitted, the blind selected pilot tone modulation method is power efficient and bandwidth efficient. Simulation results demonstrate the PAR reducing capability and the robustness of BSPTM-OFDM over frequency selective fading channels in the presence of additive noise.

Thus, apparatus and methods have been disclosed that provide for peak-to-average power ratio (or crest factor) reduction in orthogonal frequency division multiplexing (OFDM) systems using blind selected pilot tone modulation. It is to be understood that the above-described embodiments are merely illustrative of some of the many specific embodiments that represent applications of the principles discussed above. Clearly, numerous and other arrangements can be readily devised by those skilled in the art without departing from the scope of the invention.

What is claimed is:

1. Communication apparatus, comprising:
   a transmitter comprising:
      a plurality of invertible differentiating transforms for processing a frequency domain signal to generate a plurality of different sub-channel signals;
      a plurality of tagging processes for uniquely identifying each of the sub-channel signals by way of a unique tag embedded in the respective sub-channel signal;
      a plurality of inverse discrete Fourier transforms for respectively inverse Fourier transforming the sub-channel signals into the time domain;
      a plurality of upsampling processes for upsampling the inverse Fourier transformed sub-channel signals;
      a process for calculating the crest factor for each of the upsampled sub-channel signals and for selecting the sub-channel having the minimum crest factor;
      a digital-to-analog (D/A) converter for converting the selected sub-channel signal having the minimum crest factor to an analog signal for transmission;
      a power amplifier for amplifying the analog signal for transmission over a communication channel;
      a plurality of pilot shifting processes for processing a frequency domain signal to generate a plurality of different sub-channel signals having shifted pilot tones in each sub-channel signal that are shifted by a unique delay;
      a lookup table comprising a plurality of pseudo-random phase sequences; and
      a plurality of phase rotation processes for rotating phases of the sub-channel signals using the respective pseudo-random phase sequences to generate the sub-channel signals; and
   a receiver comprising:
      an analog-to-digital converter for digitizing a received analog signal;
      a discrete Fourier transform for transforming the digitized received signal into the frequency domain;
      a tag detector for detecting the unique tag embedded in the received signal and identifying the invertible differentiating transform associated with the detected tag;
      an inverse process for processing the received signal using an inverse transform of the identified differentiating transform;
      a channel estimator for estimating the communication channel;
      a symbol detector for compensating for distortion associated with the communication channel and for detecting the frequency domain signal transmitted by the transmitter;
   a peak detector for detecting the power peaks in the transformed signal to identify the shift of the pilot tone;
   a lookup table for selecting an inverse phase rotation sequence associated with the detected shift of the pilot tone; and
   a phase rotation process for rotating the transformed signal using the inverse phase sequence from the lookup table.

2. The apparatus recited in claim 1, wherein the lookup table is formed off-line and stored in both the transmitter and the receiver.

3. The apparatus recited in claim 1, wherein the elements of the lookup table are generated pseudo-randomly according to the condition $E[e^{j\phi}]=0$, with $\phi$ drawn equi-probably from $\{0, \pi\}$.

4. The apparatus recited in claim 1, wherein the shifts of the pilot tones in the transmitter are equally-spaced.

5. Communication apparatus, comprising:
  a transmitter comprising:
    a plurality of pilot shifting processes for processing a frequency domain signal to generate a plurality of different sub-channel signals having shifted pilot tones in each sub-channel signal that are shifted by a unique delay;
    a lookup table comprising a plurality of pseudo-random phase sequences;
    a plurality of phase rotation processes for rotating phases of the sub-channel signals using the respective pseudo-random phase sequences to generate the sub-channel signals;
    a plurality of inverse discrete Fourier transforms for inverse Fourier transforming the respective sub-channel signals into the time domain;
    a plurality of upsampling processes for upsampling the inverse Fourier transformed sub-channel signals;
    a process for calculating the crest factor for each of the upsampled sub-channel signals to select the sub-channel having the minimum crest factor;
    a digital-to-analog converter for converting the selected sub-channel signal having the minimum crest factor to an analog signal for transmission over a communication channel; and
    a power amplifier for amplifying the analog signal for transmission; and
  a receiver comprising:
    an analog-to-digital converter for digitizing the received analog signal;
    a discrete Fourier transform for transforming the digitized received signal into the frequency domain;
    a peak detector for detecting the power peaks in the transformed signal to identify the shift of the pilot tone;
    a lookup table for selecting an inverse phase rotation sequence associated with the detected shift of the pilot tone;
    a phase rotation process for rotating the transformed signal using the inverse phase sequence from the lookup table;
    a channel estimator for estimating the communication channel; and
    a symbol detector for compensating for distortion associated with the communication channel and for detecting the frequency domain signal transmitted by the transmitter.

6. The apparatus recited in claim 5, wherein the lookup table is formed off-line and stored in both the transmitter and the receiver.

7. The apparatus recited in claim 5, wherein the elements of the lookup table are generated pseudo-randomly according to the condition $E[e^{j\phi}]=0$, with $\phi$ equi-probably from $\{0, \pi\}$.

8. The apparatus recited in claim 5, wherein the shifts of the pilot tones in the transmitter are equally-spaced.

9. A method comprising:
  processing a frequency domain source signal using a plurality of unique tags and a plurality of invertible transforms to transform the source signal into a plurality of unique sub-channel signals;
  calculating a crest factor for each of the sub-channel signals and selecting the sub-channel signal having the minimum crest factor;
  transmitting an analog version of the selected sub-channel signal over a communication channel;
  digitizing a received sub-channel signal transmitted over the communication channel;
  transforming the digitized received signal into the frequency domain;
  detecting the unique tag associated with the digitized received signal;
  identifying the invertible transform associated with the detected tag;
  estimating the communication channel;
  compensating for distortion associated with the communication channel; and
  detecting the frequency domain source signal transmitted by the transmitter;
  wherein processing the frequency domain source signal comprises processing a frequency domain signal to generate a plurality of different sub-channel signals having shifted pilot tones in each sub-channel signal that are shifted by a unique delay, and rotating phases of the respective sub-channel signals using a plurality of pseudo-random phase sequences to generate the sub-channel signals;
  wherein detecting the unique tag comprises detecting the power peaks in the transformed signal to identify the shift of the pilot tones; and
  wherein identifying the invertible transform comprises selecting an inverse phase rotation sequence associated with the detected shift of the pilot tones, and rotating the transformed signal using an inverse phase sequence from the lookup table.

10. The method recited in claim 9, further comprising:
  inverse transforming the respective sub-channel signals into the time domain;
  upsampling the inverse transformed sub-channel signals; and
  amplifying the analog signal prior to transmission over the communication channel.

11. The method recited in claim 9, wherein the phase rotation sequences are used in transmission and reception.

12. The method recited in claim 9, wherein elements of the phase rotation sequences are generated pseudo-randomly according to the condition $E[e^{j\phi}]=0$, with $\phi$ drawn equi-probably from $\{0, \pi\}$.

13. The method recited in claim 9, wherein shifts of the pilot tones are equally-spaced.

\* \* \* \* \*